Figure 1:
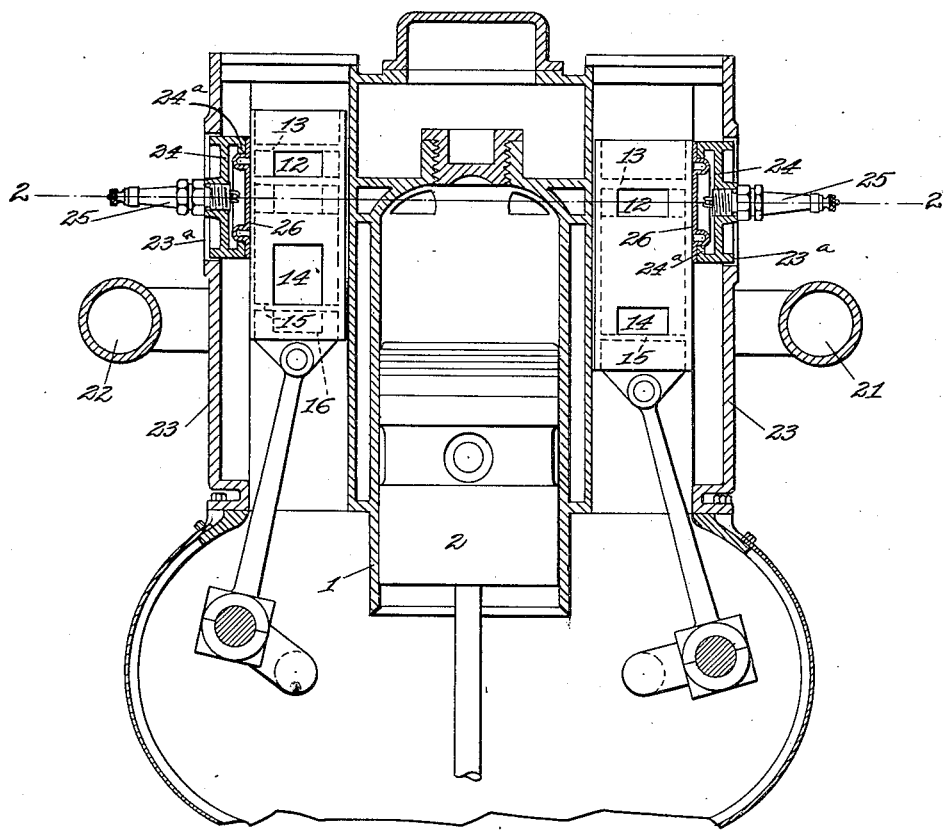

T. J. FAY.
INTERNAL COMBUSTION ENGINE.
APPLICATION FILED JUNE 3, 1914.

1,112,531.

Patented Oct. 6, 1914.
3 SHEETS—SHEET 1.

Witnesses:
R. L. Bruck.
H. B. McGill.

Inventor:
Thomas J. Fay,
By Hull & Smith,
Attys.

T. J. FAY.
INTERNAL COMBUSTION ENGINE.
APPLICATION FILED JUNE 3, 1914.
1,112,531.
Patented Oct. 6, 1914.
3 SHEETS—SHEET 2.
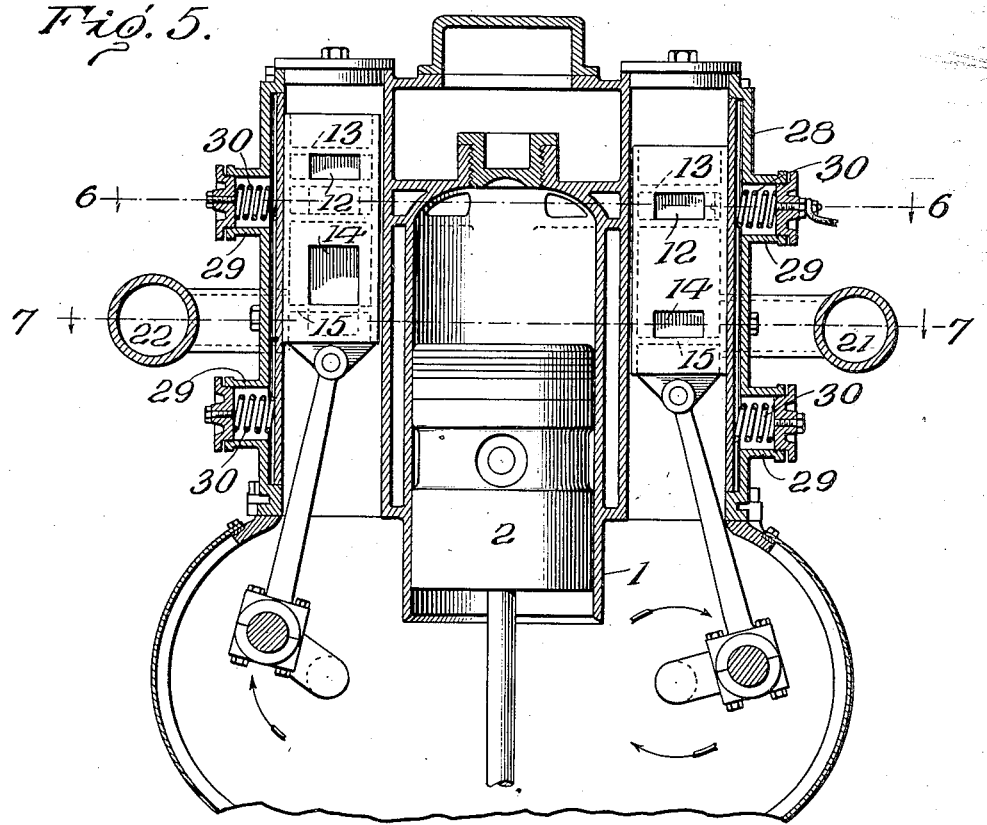
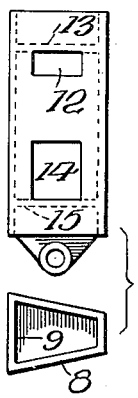
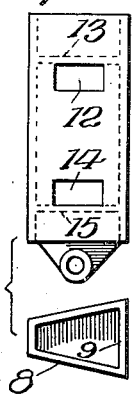

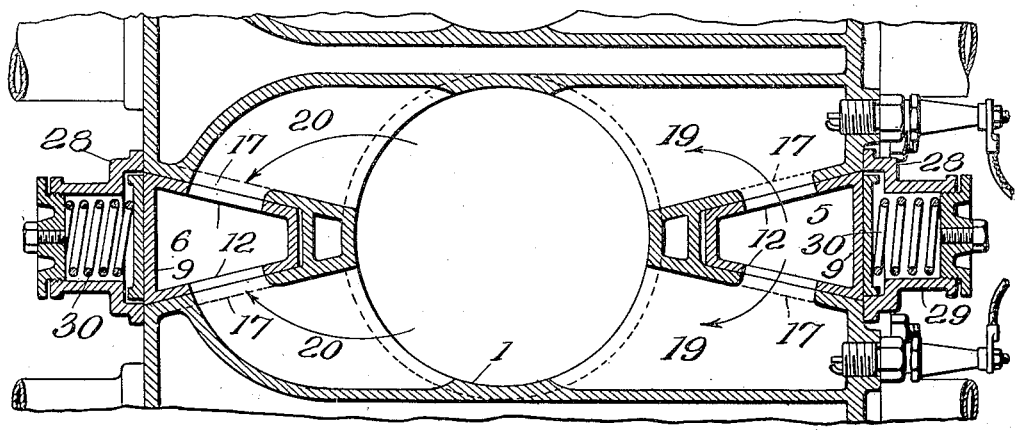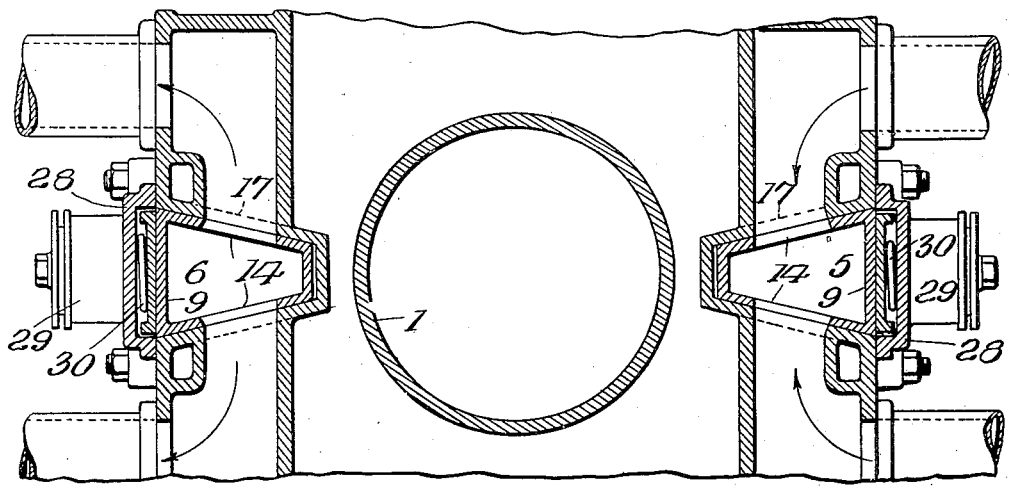

UNITED STATES PATENT OFFICE.

THOMAS J. FAY, OF BROOKLYN, NEW YORK, ASSIGNOR TO THE GOBY ENGINE COMPANY, A CORPORATION OF OHIO.

INTERNAL-COMBUSTION ENGINE.

1,112,531. Specification of Letters Patent. Patented Oct. 6, 1914.

Original application filed February 25, 1914, Serial No. 820,802. Divided and this application filed June 3, 1914. Serial No. 842,765.

*To all whom it may concern:*

Be it known that I, THOMAS J. FAY, a citizen of the United States, residing at Brooklyn, in the county of Kings and State of New York, have invented a certain new and useful Improvement in Internal-Combustion Engines, of which the following is a full, clear, and exact description, reference being had to the accompanying drawings.

This invention relates to internal combustion engines of the kind provided with hollow reciprocating slide valves for controlling the inlet and the exhaust respectively.

The general object of the invention is to provide such improvements in the construction and arrangement of the valves of engines of the above kind as shall render the valves more efficient in their action.

A further object of the invention is to provide a construction of valve and coöperating valve seat which will not only secure the efficiency referred to but which will secure the same through a construction and installation which shall be particularly economical of production.

More limitedly, the invention consists in producing, in a construction which admits of the machining of the guideways by a free outside stroke, a valve which shall possess the properties of and which shall approximate in operation a balanced valve.

A further object of the invention is to produce a valve of the type wherein the gaseous mixture may be inclosed within the inlet valve during all the phases of the cycle of the engine with the exception of the inlet or suction stroke and wherein, should the gaseous mixture referred to be exploded for any reason, the resultant action will force the valve away from its packing surfaces, thereby obviating any risk of bursting or breaking.

A further object of the invention is to provide a coöperating construction of valves, engine cylinder ports and connecting passageways whereby great efficiency is obtained.

The invention still further and more generally consists in the details and combinations hereinafter more particularly referred to, included in the claims and illustrated in the drawings forming part hereof, wherein—

Figure 2:
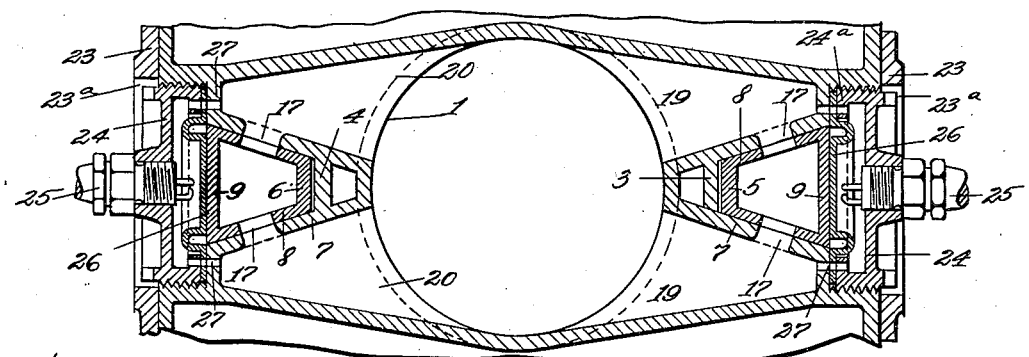

Figure 1 represents a longitudinal, sectional elevation showing an internal combustion engine provided with separate slide valves, constructed in accordance with my invention, for the admission and for the exhaust; Fig. 2 represents an enlarged sectional detail corresponding to the line 2—2 of Fig. 1; Fig. 3 is a view illustrating in elevation and plan the slide valve which controls the admission, while Fig. 4 is a similar view of the exhaust valve; Fig. 5 is a view similar to Fig. 1, of a modified form of my invention, wherein springs are employed for the purpose of balancing the unseating pressure that may be applied to the valves; Figs. 6 and 7 are respectively sectional plans corresponding to the lines 6—6 and 7—7 of Fig. 5.

In carrying my invention into effect, there is provided the usual cylinder 1 in which the piston 2 of the engine is adapted to reciprocate, there being guideways or chests 3 and 4, respectively, for the slide valves 5 and 6, whereof the valve 5 controls the admission while the valve 6 controls the exhaust. The guideways or chests 3 and 4 are provided with inclined or wedge-shaped side walls 7 converging toward the cylinder wall, and the guideways are preferably further arranged in such a manner that they are diametrically opposite one another with respect to the cylinder, so that a symmetrical arrangement is provided.

The slide valves 5 and 6 are formed with inclined side walls 8 having an inclination corresponding to that of the corresponding walls of their respective guideways, while the face 9 of each valve which is remote from the cylinder is subjected to pressure, the pressure being produced by the constructions which will be referred to hereinafter. Each slide valve is provided with superposed controlling ports 12 and 14, said ports being provided in a chamber within the valve afforded by the partitions 13 and 15 located respectively above the ports 12 and below the ports 14. In the case of the exhaust valve 6, it is preferred to make the lower controlling ports 14 of such length as to communicate at all times with the outlet connection 16. Each guideway is provided with ports 17 in the upper end thereof, which ports are adapted to communicate with the passageways 19 conducting the inlet gases to the cylinder ports (in the case of the inlet valve) and, in the case of the exhaust valve, with the passageways 20 conducting the exhaust gases from the cylinder ports to the exhaust connection. In addition to the openings or ports 17, each guideway is provided with a pair of ports which, in the case of the inlet valve, are adapted to communicate with the supply connection 21 and, in the case of the exhaust valve, are adapted to communicate with the exhaust connection 22.

23 denotes a cover which is applied to the outer face of each guideway, in any approved manner, there being a space provided between each cover and the adjacent outer face of the sliding valve within the guideway. Preferably intersecting the plane of the passageways 19 and 20, each cover will be provided with an opening 23ª for the reception of a hollow plug 24, each of which may be provided with externally threaded segments alternating with unthreaded segments of somewhat greater angular extent than the threaded segments, the threaded segments being adapted to engage internally threaded segments formed within the outer portion of the cylinder casting which contains the passageways extending between the cylinder ports and the guideway ports, the plugs being fitted in place in the familiar manner employed for fitting and locking the breech blocks of guns in place. By this construction, a cup is provided on the outside of each valve guideway. Each of these cups may conveniently carry a spark plug 25. Within each cup, there is located a resilient metal plate or disk 26, the periphery of the plate or disk being conveniently clamped in place between the plug flange 24ª and the lateral extensions of the guideways. Ports 27 are provided, one on each side of and extending through each disk or plate and placing the interior of the cup exterior thereto in communication with the passageways 19 (in the case of the inlet valve) and with the passageways 20 (in the case of the exhaust valve). By this construction, the space within each cup and upon the outside of each metal plate or disk 26 is subjected to the pressure which may exist within the passageways 19 and 20, as the case may be.

It will be evident that the gaseous pressure within the passageways 19 and 20 will be applied to the inlet and exhaust valves through the ports 17 within their respective guideway walls. Owing to the acuteness of the angle formed between the convergent faces of each guideway, the resultant pressure which is available to force the valves out of their seats in these guideways is reduced to a minimum and is, moreover, overbalanced by the superior pressure or leverage on the outer face of the valve, applicable through the ports 27. By properly relating the angles of the side walls of the valves to the yielding pressure exerted on the outer face, a construction is produced which approximates that of a balanced valve; and this construction permits of the machining of the parts by an outside and free stroke. While any angle between the tapering side walls of a valve and between the tapering side walls of the corresponding guideway will suffice that will afford a superior pressure on the outer surface of the valve (from the same source) than is exercised in opposition thereto through the inclined surfaces, a convenient angle for this purpose and one which permits of machining is an angle of 30° between the side walls, or an angle of 15° for each side wall.

An inspection of the inlet and exhaust valves will show that, while the two valves are substantially symmetrical, each having a chamber therein with longitudinally spaced ports, the lower port of the exhaust valve will be in communication with the exhaust outlet conduit at all times, insuring a free delivery of the exhaust gases introduced thereinto through the upper ports. On the other hand, the length and arrangement of the ports in the inlet valve is such that the charge of the gaseous fuel is trapped within the chamber during all strokes of the working piston except the suction stroke, at which time the lower ports are in communication with the supply conduit whereby, if any working fluid additional to the charge contained within the valve is required, this additional fluid may enter the valve chamber and pass directly into the cylinder, thus assuring a cylinder full of mixture, even though the amount of mixture contained within the valve chamber may be insufficient to fill the cylinder. This will be evident from an inspection of Figs. 1 and 2, wherein the inlet valve is shown in the position which it occupies during the suction stroke of the piston 2. Because of this treatment, the gaseous charge is admitted to the cylinder at an increased temperature and pressure. The advantages of treating heavy hydro-carbon fuel in this manner will be obvious. If the charge of fuel should for any reason explode within the slide valves, the compressive forces are transmitted in such a manner, due to the wedge shape of the valves, that the resultant pressure acts upon the part 9 of each valve, forcing the latter, against the external yielding pressure, away from its seating so that all risk of the bursting or breaking of the cylinder or slide valve will be obviated.

The controlling ports 12 and 14 and the corresponding cylinder ports 17 are located in the inclined surfaces of the valves and valve casings or guideways so that symmetrical spaces or chambers 19 are formed between the cylinder wall and the controlling ports on the admission side, while similar spaces or chambers 20 are provided on the exhaust or outlet side, which spaces cause the entering and issuing fluids to break up into two symmetrical streams. For the purpose of increasing the efficiency of working, it is preferred to arrange the spaces 19 so that the area increases in the direction of the flow of the entering fluids while, in the case of the chambers 20, the area decreases in the direction of the flow of the exhaust gases, so that in the one case free entry of the charge into the cylinder is permitted while in the case of the exhaust gases these are throttled during their passage through the chambers or spaces 20. The shape of the chambers or passageways 20 is such that the exhaust gases will flow at substantially constant speed from the cylinder ports into the valve ports, this constancy of speed being maintained independently of the pressure. This maintains the integrity of the escaping gases and enables them to maintain a plug-like characteristic until beyond the combustion chamber. Because of maintaining this plug-like character, a partial vacuum is created within the spaces through which they pass and because this plug-like form is maintained until after the gases pass the combustion chamber, the gases are prevented from flowing back into the combustion space or chamber, notwithstanding the partial vacuum created therein. The action in maintaining the constant speed in the exhaust gases is analogous to that which is secured through a Venturi tube or a modification of the same. By having the ports 14 and the exhaust valve in continuous communication with the outlet connection, the exhaust is permitted to flow into the outlet connection before it has an opportunity to cool and consequently to be discharged through the exhaust valve without loss of speed. This construction of the exhaust valve coöperates with the construction of the passageways 20 to preserve the plug-like character in the exhaust gases referred to above.

In Figs. 5 to 7, inclusive, there is shown a modification of my invention, wherein the parts are identical in construction with the like numbered parts on Figs. 1 to 4, inclusive. In these views (Figs. 5 to 7, inclusive) the cover plates 23 are replaced by cover plates 28 each having a pair of hollow bosses 29 projecting therefrom, each of said bosses being adapted to receive a spring 30 therewithin, said springs operating to hold the valves yieldably within their respective guideways.

Detailed claims covering the constructions shown in Figs. 5 to 7 inclusive are embodied in my application Ser. No. 820,802, filed Feb. 25, 1914, wherein the subject matter of the claims presented herewith is also disclosed.

It will be observed that, in both forms of my invention, means are provided whereby the pressure operating upon the inclined sides of the valves, through the ports 17, is yieldably resisted by pressure applied to the outer surface 9 of each valve.

Having thus described my invention, what I claim is:—

1. In an internal combustion engine, the combination of a cylinder having opposed pairs of laterally spaced ports, a tapered or wedge-shaped guideway interposed between the ports of each pair and having surfaces converging toward the cylinder and being open at the side remote from the cylinder and having a port in each side wall thereof, there being passageways connecting the guideway and cylinder ports, and a hollow tapered or wedge-shaped valve slidably mounted in each guideway and having ports arranged to communicate with the guideway ports, there being a chamber provided outside of the outer or enlarged end of the guideway, said chamber being in communication with said passageways whereby the pressure exerted upon the converging side walls of each valve through the guideway ports may be coöperatively opposed.

2. In an internal combustion engine, the combination of a cylinder having a pair of spaced ports, a tapered or wedge-shaped guideway interposed between said ports and having surfaces converging toward the cylinder and forming with each other an acute angle, and a hollow tapered or wedge-shaped valve slidably mounted in said guideway and adapted to communicate with the cylinder ports, there being a chamber provided for the outer or enlarged end of the guideway, said chamber being in communication with the cylinder ports and the space between the convergent faces of the guideways being arranged to communicate with the cylinder ports, whereby the pressure exerted in the guideways tending to unseat the valve may be coöperatively opposed.

3. In an internal combustion engine, the combination of a cylinder having a port, a tapered or wedge-shaped guideway having surfaces converging toward the cylinder and forming with each other an acute angle, and a hollow tapered or wedge-shaped valve slidably mounted in said guideway and adapted to communicate with the cylinder port, the space between the convergent faces of the guideway being arranged to communicate with such port and there being a chamber provided outside of the guideway which is also in communication with said port, whereby the pressure which may be exerted within the guideway to unseat the valve may be coöperatively opposed.

4. In an internal combustion engine, the combination of a cylinder having a port, a tapered or wedge-shaped guideway having surfaces converging toward the cylinder and forming with each other an acute angle, said guideway having a port adapted to communicate with the cylinder, and a hollow tapered or wedge-shaped valve slidably mounted in said guideway and having a fluid-containing chamber provided with a port whereby said valve is adapted to communicate with the cylinder through said guideway port, and means whereby pressure fluid may be applied to the outer surface of the valve to oppose the fluid pressure which may be exerted between the valve and its guideway tending to unseat the valve.

5. In an internal combustion engine, the combination of a cylinder having a port, a tapered or wedge-shaped guideway having surfaces converging toward the cylinder and forming with each other an acute angle, a hollow tapered or wedge-shaped valve slidably mounted in said guideway and adapted to control the flow of fluid between the guideway and the cylinder, and a by-pass connection subjecting the surface of the valve remote from the cylinder to the pressure therein and coöperatively opposing the unseating pressure exerted upon the valve by such cylinder pressure.

6. In an internal combustion engine, the combination of a cylinder having a port, a tapered or wedge-shaped guideway adapted to communicate with said port, a hollow tapered or wedge-shaped valve within said guideway and controlling the communication between the guideway and the cylinder port, means whereby the tapered faces of the valve are subjected to cylinder pressure in said guideway, and means whereby the outer surface of the valve is also subjected to such pressure in opposition to the unseating pressure thus applied to the converging faces of the valve.

7. In an internal combustion engine, the combination of a cylinder having a pair of laterally spaced ports, a tapered or wedge-shaped guideway interposed between said ports and the valve ports and arranged to communicate with the cylinder ports, there being passageways extending between the guideway ports and the cylinder ports, and a hollow tapered or wedge-shaped valve slidably mounted in said guideway and provided with ports adapted to coöperate with the guideway ports, there being a chamber provided on the outside of the valve, said chamber being in communication with the said passageways, whereby the pressure exerted through the guideway ports upon the inclined faces of the valves tending to unseat the same are opposed by a superior pressure acting upon the outer surface of the valve.

8. In an internal combustion engine, the combination of a cylinder having a pair of ports, a tapered or wedge-shaped guideway interposed between said ports and having surfaces converging toward the cylinder and forming with each other an acute angle, said guideway being provided with a port in each convergent face thereof communicating with a passageway extending to the cylinder port, a hollow tapered or wedge-shaped valve slidably mounted in said guideway and adapted to control the guideway ports, there being a chamber provided outside of the outer face of the valve, and a resilient metal disk or plate in said chamber bearing upon the outer face of the valve, there being ports placing said chamber in communication with each of said passageways.

9. In an internal combustion engine, the combination of a cylinder having a port, a tapered or wedge-shaped guideway having surfaces converging toward the cylinder and forming with each other an acute angle, said guideway being adapted to communicate with the cylinder port, a hollow tapered or wedge-shaped valve slidably mounted in said guideway and adapted to communicate with the cylinder port through said guideway, there being a chamber provided outside of the outer face of the valve, and a resilient metal disk or plate in said chamber bearing upon the outer face of the valve, and means placing said chamber in communication with the cylinder port.

10. In an internal combustion engine, the combination of a cylinder having a port, a guideway having a port adapted to communicate with the cylinder port, a hollow valve within said guideway and adapted to communicate with and to control the port thereof and having a part subjected to fluid pressure acting in a direction to unseat the valve, and a fluid connection for subjecting the part of the valve which is opposed to the first mentioned part to fluid pressure coöperatively opposing the pressure on the first mentioned part.

11. In an internal combustion engine, the combination of a cylinder having a port, a guideway having a port adapted to communicate with the cylinder port, a hollow valve within said guideway and adapted to communicate with and to control the port thereof and having a part exposed to pressure from the cylinder acting in a direction to unseat the valve, and a by-pass communicating with the cylinder port and arranged to subject the part of the valve opposed to the first mentioned part to coöperatively opposing pressure from the cylinder.

12. In an internal combustion engine, the combination of a cylinder having a port, a tapered or wedge-shaped guideway having surfaces converging toward the cylinder and being open to the atmosphere at the side remote from the cylinder, a tapered or wedge shaped valve slidably mounted in said guideway and provided with a port arranged to communicate with the cylinder port, and means yieldably holding said valve within its guideway.

13. In an internal combustion engine, the combination of a cylinder having a port, a wedge-shaped or tapered guideway having surfaces converging toward the cylinder and provided with a port, a hollow wedge-shaped or tapered valve reciprocably mounted in the guideway and having a port, the portion of the valve which is remote from the cylinder being exposed to the external atmosphere, and means coöperating with such portion of the valve to force the same into its seat in the guideway.

14. In an internal combustion engine, the combination of a cylinder, said cylinder having a pair of opposed ports and a tapered or wedge-shaped guideway communicating with each port and having surfaces converging toward the cylinder, a hollow wedge-shaped slide valve reciprocably mounted in each guideway and provided with a port adapted to communicate with its guideway port, and means coöperating with the surface of each valve which is remote from the cylinder for yieldably retaining the valve within the seat formed in its guideway.

15. In an internal combustion engine, the combination of a cylinder having opposed ports, a piston in said cylinder, a pair of guideways each having a port communicating with a cylinder port, a sliding valve reciprocably mounted in each guideway and each having a chamber therein provided with longitudinally spaced ports, one of the ports of each valve being adapted to communicate with the casing port and the other with a fluid connection, the inlet valve ports being so arranged as to trap the fluids therein until the suction stroke of the piston and one of the exhaust valve ports being so arranged as to communicate with the corresponding fluid connection throughout the working operation of the piston.

16. In an internal combustion engine, the combination of a cylinder having a pair of laterally spaced ports, a guideway extending substantially parallel with the cylinder axis and interposed between said ports, there being passageways extending from the guideway ports to the cylinder ports, said passageways varying symmetrically in cross-sectional area between the guideway ports and the cylinder ports, and a sliding valve mounted within the guideway and having a chamber provided with ports arranged to register with said passageways and with a port arranged to communicate with a fluid conduit.

17. In an internal combustion engine, the combination of a cylinder, said cylinder being provided with a pair of ports on one side thereof and a pair of opposed ports on the opposite side thereof, a guideway extending longitudinally of the cylinder on each side of the same and between the two ports on such side, there being passageways extending between the cylinder and guideway ports, the passageways on both sides of the cylinder increasing symmetrically in cross sectional area from the guideway ports toward the cylinder ports, a sliding valve within each guideway and having a chamber provided with ports adapted to register with its guideway ports, there being one or more fluid conduits adapted to communicate with each valve chamber, and means for reciprocating said valves.

18. In an internal combustion engine, the combination of a cylinder having a pair of laterally spaced ports in one wall thereof and a pair of oppositely spaced ports in the opposite wall thereof, a guideway interposed between each pair of ports and extending longitudinally of said cylinder, each of said guideways being provided with ports each communicating with a passageway extending between such guideway port and the cylinder port, an inlet valve slidably mounted in one of said guideways and an exhaust valve slidably mounted in the other guideway, each valve having a chamber therein provided with ports adapted to register with its guideway ports and each chamber being provided with a port longitudinally spaced from the first mentioned chamber ports and adapted to communicate the one with a supply conduit and the other with an exhaust conduit, the passageways conducting the fuel supply from the inlet valve guideway to the cylinder ports increasing symmetrically in cross sectional area and the passageways conducting the exhaust gases to the exhaust valve guideway decreasing in cross sectional area, and means for reciprocating said valves.

19. In an internal combustion engine, the combination of a cylinder, said cylinder having pairs of opposed ports at the head thereof and a longitudinally extending wedge-shaped guideway interposed between each pair of ports, the walls of the guideway converging toward the cylinder, a hollow wedge-shaped valve in each guideway, each guideway being provided with ports adapted to communicate with the cylinder ports and each valve being provided with ports adapted to register with its guideway ports, and means yieldably retaining each of said valves in its guideway.

In testimony whereof, I hereunto affix my signature in the presence of two witnesses.

THOMAS J. FAY.

Witnesses:
J. B. HULL,
BRENNAN B. WEST.